United States Patent
Sato et al.

(10) Patent No.: US 8,270,836 B2
(45) Date of Patent: Sep. 18, 2012

(54) SIGNAL TRANSMITTING DEVICE, TRANSMITTER AND RECEIVER

(75) Inventors: Yoshihide Sato, Kanagawa (JP); Kazuhiro Suzuki, Kanagawa (JP); Hidenori Yamada, Kanagawa (JP); Tomo Baba, Oita (JP)

(73) Assignee: Fuji Xerox Co., Ltd., Tokyo (JP)

( * ) Notice: Subject to any disclaimer, the term of this patent is extended or adjusted under 35 U.S.C. 154(b) by 253 days.

(21) Appl. No.: 12/637,870

(22) Filed: Dec. 15, 2009

(65) Prior Publication Data

US 2010/0149416 A1    Jun. 17, 2010

(30) Foreign Application Priority Data

Dec. 15, 2008  (JP) ................ P2008-319026
Jul. 17, 2009  (JP) ................ P2009-169245

(51) Int. Cl.
*H04J 14/02*    (2006.01)
(52) U.S. Cl. ............. 398/91; 398/154; 398/155
(58) Field of Classification Search .......... 398/91, 398/154–155
See application file for complete search history.

(56) References Cited

U.S. PATENT DOCUMENTS

| 2005/0063707 A1 | 3/2005 | Imai |
| 2005/0094676 A1 | 5/2005 | Iwami et al. |
| 2006/0008276 A1* | 1/2006 | Sakai et al. ............ 398/141 |

FOREIGN PATENT DOCUMENTS

| JP | 2005-73220 | 3/2005 |
| JP | 2005-130358 | 5/2005 |
| JP | 2007-53675 | 3/2007 |

* cited by examiner

*Primary Examiner* — Leslie Pascal
(74) *Attorney, Agent, or Firm* — Fildes & Outland, P.C.

(57) ABSTRACT

A signal transmitting device includes a transmitter, a receiver, and four optical fibers. The transmitter includes a first electro-optical converter electro-optically converting original electrical red video signal into optical red video signal in original video signal, a second electro-optical converter electro-optically converting original electrical green video signal into optical green video signal a third electro-optical converter electro-optically converting original electrical blue video signal into optical blue video signal, a parallel/serial converter converting original electrical parallel signal having a lower transfer rate than a transfer rate of the original video signal into original electrical serial signal, and a fourth electro-optical converter electro-optically converting the original electrical serial signal transmitted from the parallel/serial converter into optical serial signal. The receiver includes a first optical-electro converter, a second optical-electro converter, a third optical-electro converter, a fourth optical-electro converter, a clock signal generator, and a serial/parallel converter.

14 Claims, 8 Drawing Sheets

SIGNAL TRANSMITTING DEVICE, TRANSMITTER AND RECEIVER

CROSS-REFERENCE TO RELATED APPLICATIONS

This application is based upon and claims priority under 35 USC 119 from Japanese Patent Application No 2008-319026, filed Dec. 15, 2008, and Japanese Patent Application No. 2009-169245, filed Jul. 17, 2009.

BACKGROUND

1. Technical Field

The present invention relates to a signal transmitting device for transmitting video signals of red, green and blue (R, G and B) according to DVI standard and other signals through an optical fiber, a transmitter and a receiver.

2. Related Art

In a signal transmitting device for transmitting a video signal from a source apparatus such as a personal computer (PC) or a DVD player to a display device, when the number of display pixels is increased with an enhancement in a definition of the display device, a high transfer rate is required correspondingly. In the case in which a signal is subjected to a long distance transmission, particularly, a transmission loss is great in an electric signal through an electric wire. For this reason, there is a possibility that a video cannot be accurately displayed on the display device. A waveform distortion is increased in an analog video signal so that quality of the video is remarkably deteriorated. Also in a digital video signal, moreover, quality of a signal is deteriorated through an electric cable according to Digital Visual Interface (DVI) standard. For example, referring to UXGA (1600×1200 pixels), a transmittable distance is restricted to be a short distance of approximately 10 m.

As a signal to be transmitted according to DVI standard, DDC (Display Data Channel)-Data (DDC data), DDC-Clock (DDC clock) and HotPlugDetect and +5V Power for a data communication of the display device are defined in addition to four signals including R, G and B video signals and a clock signal thereof. Furthermore, a control signal or an audio signal is also transmitted as a transmitting signal between the source apparatus and the display device if necessary. Video associated signals of R, G and B and the clock in the transmitting signals are high frequency signals. On the other hand, the control signal and the audio signal are lower frequency signals as compared with the video associated signals.

SUMMARY OF THE INVENTION

According to an aspect of the invention, a signal transmitting device includes a transmitter, a receiver, and four optical fibers. The transmitter includes a first electro-optical converter electro-optically converting original electrical red video signal in original video signal according to DVI standard into optical red video signal, a second electro-optical converter electro-optically converting original electrical green video signal in the original video signal into optical green video signal, a third electro-optical converter electro-optically converting original electrical blue video signal in the original video signal into optical blue video signal, a parallel/serial converter converting original electrical parallel signal having a lower transfer rate than a transfer rate of the original video signal into original electrical serial signal based on an original clock signal of the original video signal, and a fourth electro-optical converter electro-optically converting the original electrical serial signal transmitted from the parallel/serial converter into optical serial signal. The receiver includes a first optical-electro converter optical-electro converting the optical red video signal into electrical red video signal, a second optical-electro converter optical-electro converting the optical green video signal into electrical green video signal, a third optical-electro converter optical-electro converting the optical blue video signal into electrical blue video signal, a fourth optical-electro converter optical-electro converting the optical serial signal into electrical serial signal, a clock signal generator generating clock signal from the electrical serial signal, and a serial/parallel converter converting the electrical serial signal into electrical parallel signal based on the clock signal. The four optical fibers optically connect the first to fourth electro-optical converters to the first to fourth optical-electro converters respectively.

BRIEF DESCRIPTION OF THE DRAWINGS

Exemplary embodiments of the invention will be described in detail based on the following figures, wherein.

DETAILED DESCRIPTION

Figure 1:
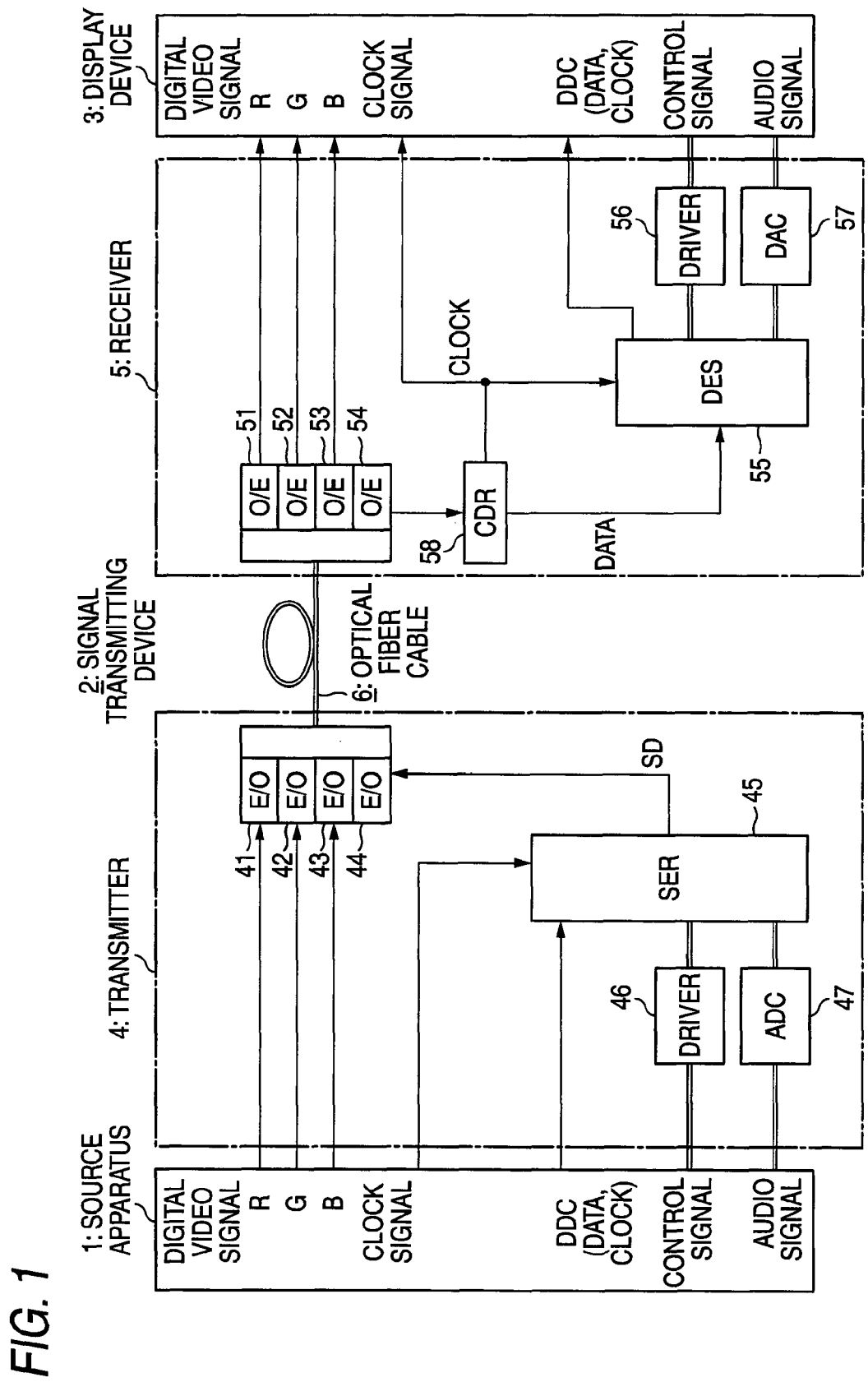
FIG. 1 is a diagram showing an exemplary embodiment of a signal transmitting device.

FIG. 1 is a diagram showing an exemplary embodiment of a signal transmitting device. As shown, a source apparatus 1 serves to transmit a signal to a display device 3 through a signal transmitting device 2. According to DVI standard, as the signal to be transmitted from the source apparatus 1, a DDC signal (DDC data and a DDC clock), HotPlugDetect and +5V Power for a data communication of the display device are defined in addition to four signals including red, green and blue (R, G and B) digital video signals and a clock signal thereof. When the video signal is VGA (640×480), the R, G and B have a transfer rate of 252 Mbps and the clock has frequency of 25.2 MHz. When the video signal is UXGA (1600×1200), the R, G and B have a transfer rate of 1.62 Gbps and the clock has frequency of 162 MHz. Moreover, it is necessary for the DDC to correspond to a transfer rate up to a standard of 100 kbps and a first mode of 400 kbps on the standard. In addition, a control signal or an audio signal is also transmitted as the transmitting signal between the source apparatus 1 and the display device 3 if necessary.

The control signal is subjected to a two-way communication including a transmission from the source apparatus 1 to the display device 3 or a transmission from the display device 3 to the source apparatus 1 in order to carry out a control such as ON/OFF of a power supply of the display device 3, a change in a resolution or a volume control. For example, RS-232C has a transfer rate of approximately 9,600 bps. For the audio signal, an analog audio signal or a digital audio signal is transmitted. In the case in which an analog stereo audio signal is transmitted, it is once converted into a digital signal and the digital signal is transmitted at a transmitting side, and the digital signal is converted into an analog signal again and the analog signal is transmitted to an audio circuit of the display device 3 at a receiving side. At this time, a sampling frequency and the number of quantized bits are properly selected corresponding to audio quality. For example, when the sampling frequency is 44.1 kHz and the number of quantized bits is 16 bits in a stereo, a transmitting data volume of 2×44,100×16=approximately 1.41 Mbps is obtained. On the other hand, in the case in which the digital audio signal is transmitted, the transmitting data volume is approximately 3 Mbps depending on the sampling frequency or the number of bits according to SPDIF standard used in a large number of AV apparatuses.

The signal transmitting device 2 includes a transmitter 4, a receiver 5 and an optical fiber cable 6 for optically connecting the transmitter 4 to the receiver 5.

The transmitter 4 has first to third electro-optical converters 41 to 43 for electro-optically converting the video signals of R, G and B according to DVI standard which are transmitted from the source apparatus 1 respectively, a parallel/serial converter (SER) 45 for converting a parallel signal having a lower transfer rate than the video signal transmitted from the source apparatus 1 as a separate signal from the video signal, for example, a DDC signal (DDC data and a DDC clock), a control signal and an audio signal into serial signals by using the clock signal of the video signals, and a fourth electro-optical converter 44 for electro-optically converting the serial signal (SD) transmitted from the parallel/serial converter 45. As shown, a control signal and an audio signal which are transmitted from the source apparatus 1 are input to the parallel/serial converter 45 through a driver 46 and an analog/digital converter (ADC) 47, respectively.

Although the optical fiber cable 6 is a single four-core optical fiber cable storing four optical fibers connected to the first to fourth electro-optical converters respectively, for example, the invention is not restricted thereto. For example, the four optical fibers may be provided individually or four optical fibers in a single optical fiber cable having at least five cores storing at least five optical fibers can also be used.

The receiver 5 includes first to third optical-electro converters 51 to 53 for optical-electro converting the video signals of R, G and B transmitted from the three optical fibers connected to the first to third electro-optical converters 41 to 43 respectively, a fourth optical-electro converter 54 for optical-electro converting the serial signal transmitted from the optical fiber connected to the fourth electro-optical converter 44, a clock signal regenerator 58 for regenerating the clock signal of the video signal from the serial signal converted optical-electro, and a serial/parallel converter (DES) 55 for converting the serial signal converted optical-electro into a parallel signal by using the regenerated clock signal. The clock signal regenerator 58 is a clock-data-recovery (CDR) circuit, for example. The video signals of R, G and B converted optical-electro by the first to third optical-electro converters 51 to 53 and the regenerated clock signal are input to the display device 3, respectively. A DDC signal (DDC data and a DDC clock) transmitted from the serial/parallel converter 55 is input to the display device 3. A control signal and an audio signal which are transmitted from the serial/parallel converter 55 are input to the display device 3 through a driver 56 and a digital/analog converter (DAC) 57, respectively.

Thus, the R, G and B in the digital video signals according to DVI standard are electro-optically converted (E/O) as they are in the transmitter 4 and are transmitted to the receiver 5 through three core wires in the optical fiber cable 6 respectively, and are optical-electro converted (O/E) in the receiver 5 and are then transmitted to the display device 3. As the signals to be transmitted from the source apparatus 1 to the display device 3, the DDC signal (the DDC data and the DDC clock), the control signal (RS-232C Tx) and the audio signal are converted into serial signals (SD) through the parallel/serial converter (SER) 45. The conversion processing is carried out by using the clock signal according to DVI standard as a clock at this time. The serial signal is electro-optically converted (E/O) in the transmitter 4 and is transmitted to the receiver 5 by using a separate core wire from the core wire described above in the optical fiber cable 6. The received serial signal is optical-electro converted (O/E) in the receiver 5 and the clock signal according to DVI standard is then regenerated from the received serial signal by the clock signal regenerator 58, and furthermore, the clock signal thus regenerated is used to regenerate the data signals in a serial state into original signals by the serial/parallel converter 55 respectively, and the DDC signal is transmitted to the display device 3 and the control signal and the audio signal are transmitted to the display device 3 through the driver 56 and the digital/analog converter (DAC) 57, respectively. Thus, the digital video signal according to DVI standard, the clock signal, the DDC signal, the control signal and the audio signal are transmitted through a single four-core optical fiber cable. In the case in which the digital video signal according to DVI standard corresponds to high resolution UXGA, for example, each of the video signals R, G and B has a transfer rate of 1.62 Gbps. When the signals are changed into serial signals to be transmitted by a single optical fiber as a signal transmitting method, a circuit structure for a transmission at approximately 5 Gbps is required. For this reason, a circuit is complicated and a cost is increased. By assigning a single core wire (an optical fiber) to each of the signals as described above, however, it is possible to reduce the transfer rate to be 1.62 Gbps at a maximum. Thus, it is also possible to prevent the circuit from being complicated and to suppress the increase in the cost. By assigning another core wire (an optical fiber) to the serial signal subjected to the parallel/serial conversion by using the clock signal, moreover, it is possible to regenerate the clock signal, the DDC signal, the control signal and the audio signal from the serial signal at the receiving side without providing a metal wiring for transmitting the DDC signal, the control signal and the audio signal.

Figure 2:
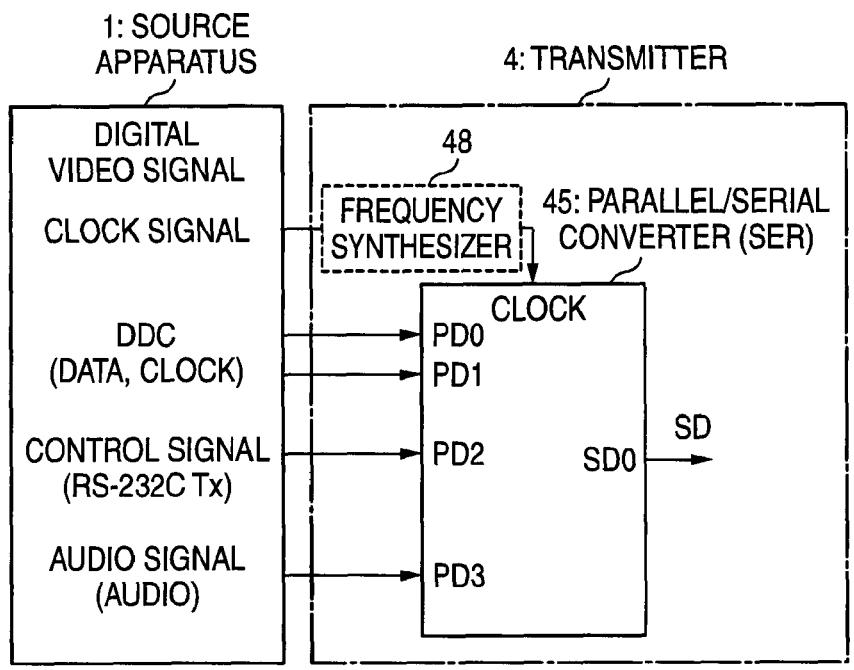
FIG. 2 is a diagram for explaining an example of a parallel/serial converter (SER) in a transmitter.

FIG. 2 is a diagram for explaining an example of the parallel/serial converter (SER) in the transmitter. In the example, there is shown the case in which four signals including DDC data and a DDC clock, a control signal (RS232C Tx) and a digital audio signal (Audio) are used as a parallel signal to be converted into a serial signal through the parallel/serial converter 45. As a matter of course, it is preferable to constitute a transmitting data form depending on the number of the signals to be transmitted. In the parallel/serial converter (SER) 45 shown in FIG. 2, PDn (n=0 to 3) indicates a parallel signal input portion and SD0 indicates a serial signal output portion. The DDC data, the DDC clock, the control signal (RS232C Tx) and the digital audio signal (Audio) are input to the parallel signal input portions PD0, PD1, PD2 and PD3, respectively. The parallel/serial converter 45 converts the parallel signal into the serial signal by using the clock signal of the digital video signal. Since the serial signal thus converted is generated based on the clock signal, it can be treated as a clock composite signal. If the DDC signal is set to have a transfer rate of 100 kbps or 400 kbps, the control signal (RS232C Tx) is set to have a transfer rate of 9600 bps and the digital audio signal (Audio) is set to have a transfer rate of 3 Mbps or less, the clock signal of the video signal can be sufficiently converted into a serial signal at an approximately sevenfold frequency because it has a frequency of 25.2 MHz to 162 MHz. In the case in which the transmitting signal speed is higher so that the conversion processing using the clock signal of the video signal is insufficient, a frequency synthesizer 48 is provided in a former stage of the parallel/serial converter 45 to multiply the clock signal to have a sufficient frequency. The parallel/serial converter 45 converts a parallel signal into a serial signal by using the clock signal thus multiplied. The frequency synthesizer 48 is not indispensable but is provided if necessary.

Figure 3:
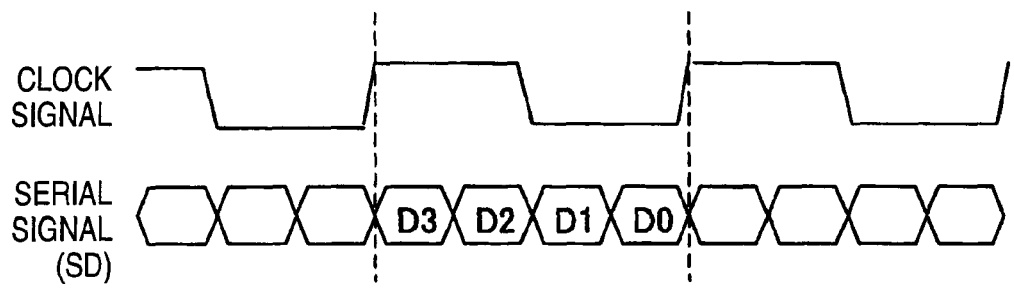
FIG. 3 is a diagram showing an example of a relationship between a clock signal and a serial signal (SD)

FIG. 3 is a diagram showing an example of a relationship between the clock signal and the serial signal (SD). Although there is a possibility that a timing shift might be generated due to a delay time of a processing circuit between both of the signals, it is not described herein. In the example, four parallel signals are processed. Therefore, a data speed of the serial signal is four times as high as the clock of the video signal. In FIG. 3, Dn (n=0 to 3) corresponds to a signal to be input to the parallel signal input portion PDn.

Figure 4:
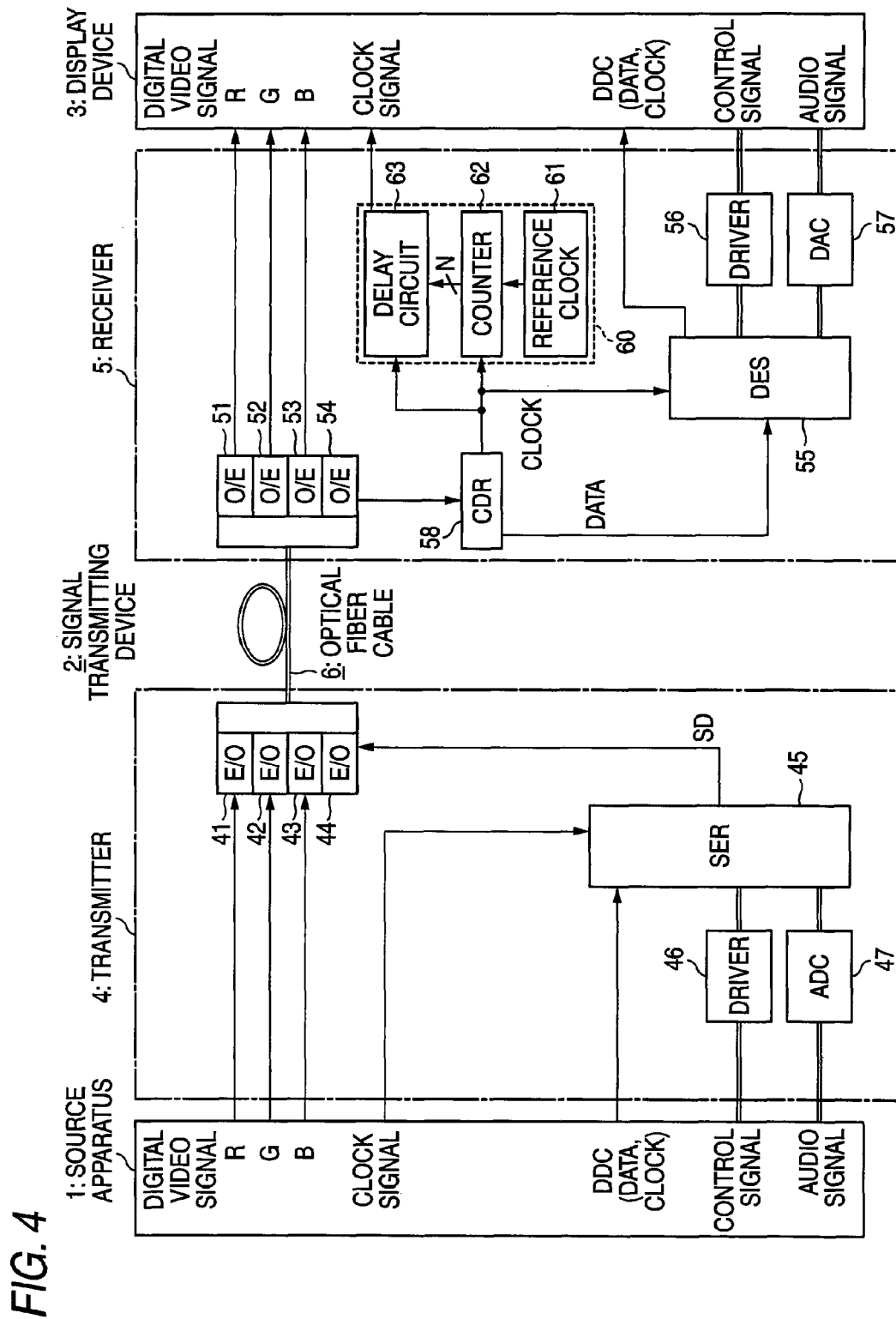
FIG. 4 is a diagram showing another exemplary embodiment of the signal transmitting device.

FIG. 4 is a diagram showing another exemplary embodiment of the signal transmitting device. Although the exemplary embodiment is different from the exemplary embodiment in FIG. 1 in that a timing shift (a skew) generated between each of R, G and B signals of a digital video signal and a clock signal is adjusted in a receiver 5, it is the same as the exemplary embodiment in FIG. 1 in the other respects. In the exemplary embodiment, as shown in FIG. 4, a serial signal subjected to an electro-optical conversion (E/O) and transmitted in a transmitter 4 is optical-electro converted (O/E) in the receiver 5 and a clock signal according to DVI standard is then regenerated from the received serial signal by a clock signal regenerator 58, and furthermore, a data signal in a serial state is regenerated into each original signal through a serial/parallel converter 55 by using the clock single thus regenerated, and a DDC signal is transmitted to a display device 3 and a control signal and an audio signal are transmitted to the display device 3 through a driver 56 and a digital/analog converter (DAC) 57, respectively.

In order to carry out a timing adjustment for the R, G and B of the digital video signals and the clock signal, it is necessary to satisfy a specification of a skew which is defined in DVI standard. The skew on the DVI standard is set to be 0.40 Tpixel or less (Tpixel indicates a clock cycle). Accordingly, an allowable value of the skew is equal to or smaller than 15.9 ns in VGA and is equal to or smaller than 2.47 ns in UXGA. When the number of pixels is increased, the skew has the allowable value reduced and becomes harder.

In the exemplary embodiment, therefore, a timing adjuster 60 for adjusting a shift of a timing between the clock signal regenerated by the clock signal regenerator 58 and the video signal is provided in the receiver 5. The timing adjuster 60 has a reference clock generator 61, a counter 62 and a delay circuit 63. As shown, a clock separated by the clock signal regenerator 58 is compared with a reference clock generated from the reference clock generator 61, and a difference in a frequency is detected by the counter 62 to carry out a conversion into N-bit data corresponding to the difference in the frequency. Based on the N-bit data, a delay step of a programmable delay line serving as the delay circuit 63, for example, is selected to delay the clock by a desirable value. Consequently, the timing adjustment for the clock signal and each of the R, G and B signals of the digital video signal is carried out to include the skew in a specified value on the DVI standard. By giving the delay to the clock signal regenerated by the clock signal regenerator 58, thus, it is possible to automatically adjust the skew between the digital video signal and the clock signal. For example, the programmable delay line has 16 delay amount steps with N=4 bits. If a delay amount step of 1 ns/step is used, the adjustment can be carried out within a range of 0 to 15 ns as a timing.

Figure 5:
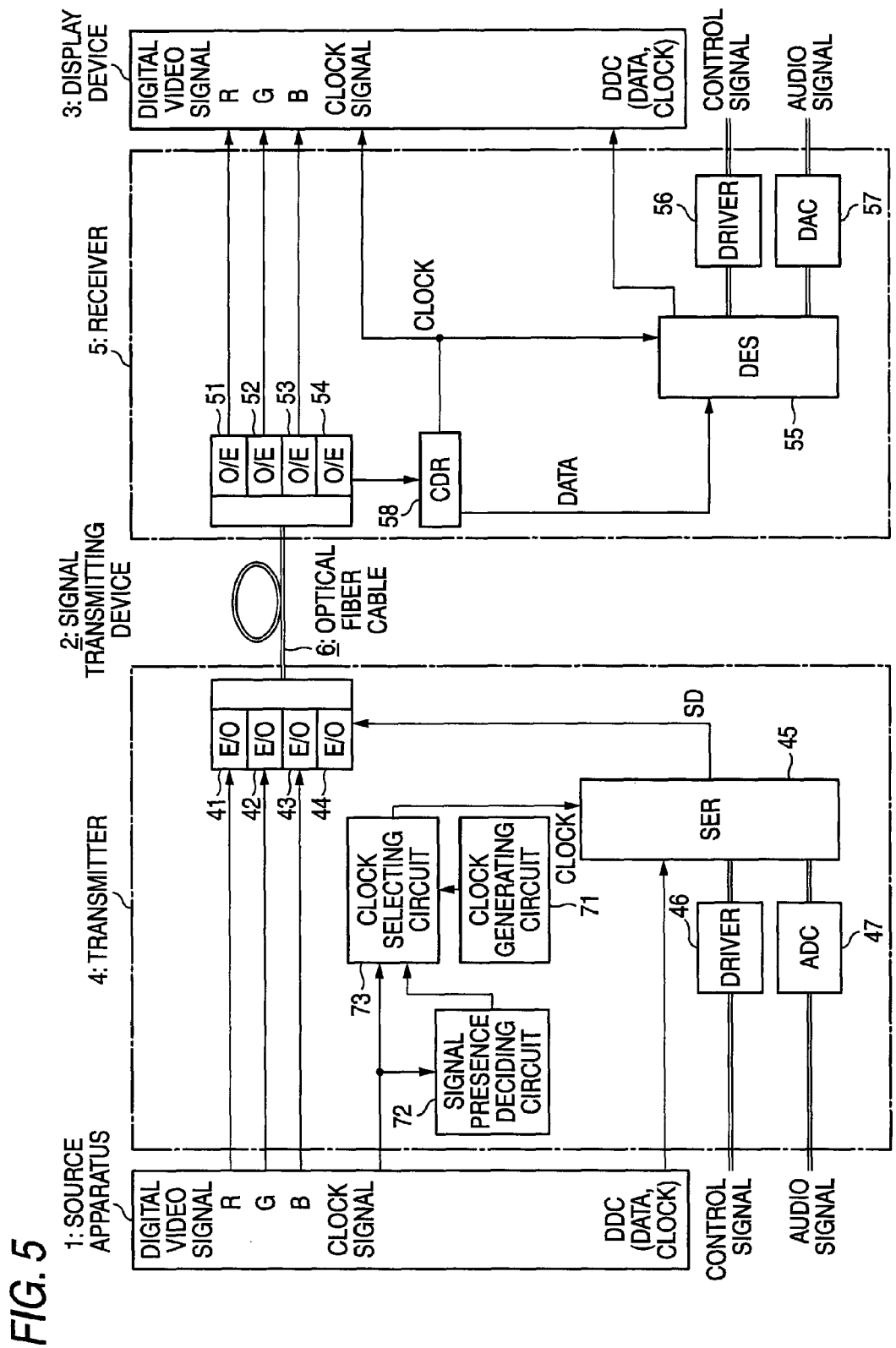
FIG. 5 is a diagram showing yet another exemplary embodiment of the signal transmitting device.

FIG. 5 is a diagram showing yet another exemplary embodiment of the signal transmitting device. Although the exemplary embodiment is different from the exemplary embodiment in FIG. 1 in that there is employed a structure in which a control signal can be transmitted from a transmitter side to a receiver side also in the case in which a clock signal of a digital video signal on a DVI standard is not input, it is the same as the exemplary embodiment shown in FIG. 1 in the other respects. In other words, in the exemplary embodiment, a transmitter 4 has a clock signal generating circuit 71 for generating a clock signal, a signal presence deciding circuit 72 for deciding a presence of a clock signal of a video signal, and a clock selecting circuit 73 for selecting the clock signal generated from the clock signal generating circuit 71 as a clock signal to be used in a parallel/serial converter (SER) 45 if it is decided that the clock signal of the video signal is not present by the signal presence deciding circuit 72 as shown in FIG. 5. A low speed parallel signal includes a control signal for controlling an apparatus, for example, a signal for turning ON/OFF a power supply of an apparatus to be a connecting destination. The control signal cannot be transmitted until the clock signal of the video signal (DVI) is input. By the structure described above, however, it is possible to transmit the control signal from the transmitter side to the receiver side also in a state in which the clock signal of the video signal is stopped.

Although a crystal oscillator of 100 MHz can be used as the clock signal generating circuit 71, for example, the invention is not restricted thereto. Although the signal presence deciding circuit 72 can be constituted by using a CML buffer having an LOS (Loss of Signal) function for receiving the clock signal of the digital video signal on the DVI standard or an equalizer IC, for example, the invention is not restricted thereto. The LOS is asserted when it is lower than a threshold having a signal amplitude. In other words, when the clock signal of the video signal is stopped, the LOS is asserted and it is detected that the clock signal is not present. On the other hand, it is detected that the clock signal of the video signal is present in a negate state of the LOS. The clock selecting circuit 73 is constituted by a switch circuit for a high speed signal, for example, and an internal clock signal generated by the clock signal generating circuit 71 and a signal output from the signal presence deciding circuit 72 are input thereto. An LOS signal changes over the switch circuit. When the LOS signal is asserted, the internal clock signal is selected. When the LOS signal is set into the negate state, the clock signal of the video signal is selected. The clock signal thus selected is input to the parallel/serial converter (SER) 45 and is used as a clock for a serialization of an audio signal, DDC or a control signal.

By the structure, in the case in which the clock signal of the video signal is present, serial data serialized by the clock signal are transmitted to the receiver and the clock signal is regenerated on the receiver side and is transmitted as the clock of the video signal to a display device 3. Even if the clock signal of the video signal is set into the stopping state, moreover, the control signal can be serialized in response to the internal clock of the transmitter and can be transmitted to a receiving device. In the exemplary embodiment, thus, the control signal can be transmitted to the receiver also in a state in which a video source is stopped or is not connected and the clock signal of the DVI signal is not input to the transmitter. Also after the video signal is stopped, it is possible to carry out an ON/OFF control of a power supply in the display device, for example. Consequently, a remote operability can be enhanced. The clock selecting circuit or the parallel/serial converter may be constituted in single FPGA. Furthermore, the signal presence deciding circuit can also be constituted by the same FPGA. Although an input/output destination of the audio signal or the control signal is set into an outside of a source apparatus or the display device in the exemplary embodiment shown in FIG. 5, it may be set into an inside. The same structure is also applied to the other exemplary embodiments.

Figure 6:
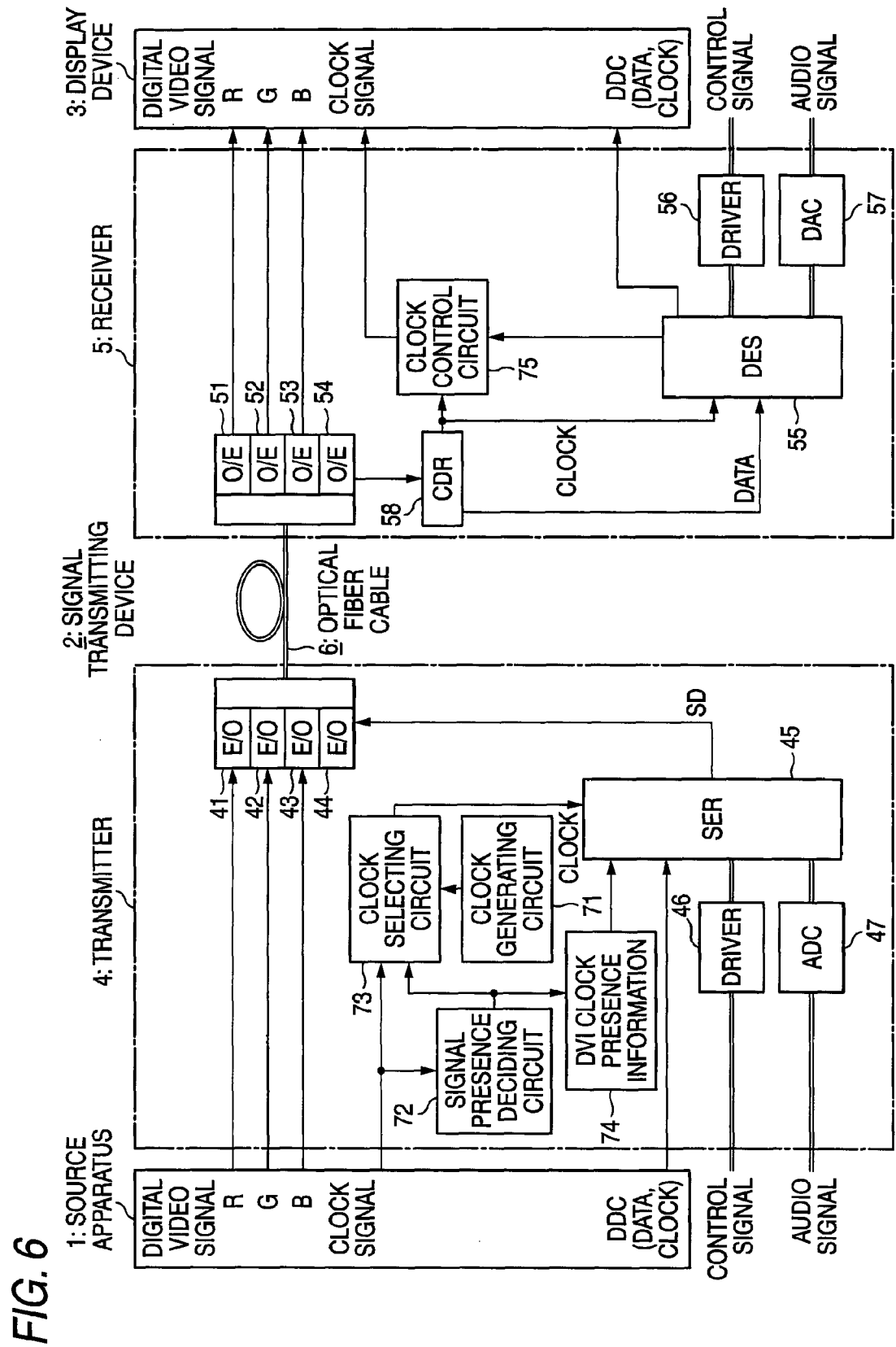
FIG. 6 is a diagram showing a further exemplary embodiment of the signal transmitting device.

FIG. 6 is a diagram showing a further exemplary embodiment of the signal transmitting device. Although the exemplary embodiment is different from the exemplary embodiment in FIG. 5 in that presence information about a clock signal of a digital video signal on a DVI standard is transmitted from a transmitter side to a receiver side, it is the same as the exemplary embodiment in FIG. 5 in the other respects. In other words, in the exemplary embodiment, there is provided a DVI clock presence information transmitting portion 74 for transmitting the presence information about the clock signal of the video signal which is decided by a signal presence deciding circuit 72 as shown in FIG. 6. The presence information about the clock signal is multiplexed into a serial signal through a parallel/serial converter 45 and the serial signal is transmitted to a receiver 5. The receiver 5 acquires the presence information about the clock signal of the video signal from the serial signal which is received. Although a presence information acquiring circuit for acquiring the presence information is not shown and can be constituted in single FPGA together with a serial/parallel converter 55, for example, the invention is not restricted thereto. The receiver 5 has a clock control circuit 75 as shown. The clock control circuit 75 carries out a control so as not to output the clock signal of the video signal to a display device 3 when the presence information indicates that the clock signal of the video signal is not present and to output the clock signal of the video signal to the display device 3 when the presence information indicates that the clock signal of the video signal is present. When the clock signal is output to the display device though the video signal is stopped, the display device tries to output the video signal. By preventing the clock from being output to the display device when the video signal is stopped as in the exemplary embodiment, however, it is possible to avoid an abnormal state of the display device.

Figure 7:
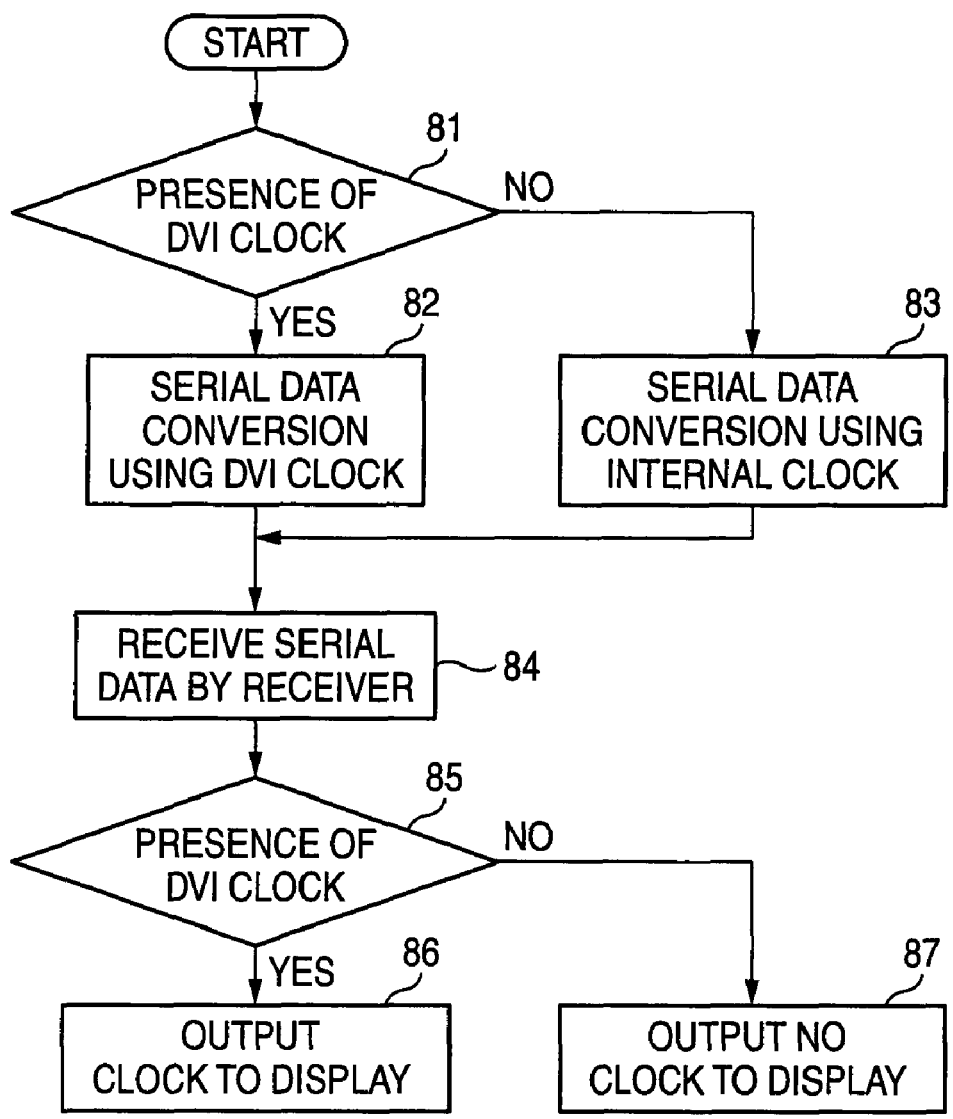
FIG. 7 is a flowchart for explaining an example of an operation according to the exemplary embodiment in FIG. 6.

FIG. 7 is a flowchart for explaining an example of an operation according to the exemplary embodiment in FIG. 6. First of all, the presence of the clock signal of the digital video signal on the DVI standard is decided on the transmitter side at Step 81. As a result of the decision, if the clock signal is present, the clock signal of the video signal (DVI) is selected and is used to convert parallel data into serial data at Step 82. If the clock signal is not present, an internal clock generated from the clock signal generating circuit is selected and is used to convert the parallel data into the serial data at Step 83. On the receiver side, the serial data are received by the receiver at Step 84 and the presence of the clock signal of the video signal (DVI) is decided at Step 85. As a result of the decision, if the clock signal is present, it is output to the display device at Step 86. If the clock signal is not present, it is not output to the display device at Step 87. A distribution from the Step 85 to the Step 86 or 87 is carried out by the clock control circuit 75 provided in the receiver 5.

The operation is carried out for the following reason. When the clock signal of the video signal (DVI) is input, the display device 3 is changed from a standby state into an operating state. When the DVI signal of the source apparatus 1 is stopped, the internal clock signal is selected in the transmitter 4 and is transmitted to the receiver 5. With the structure in FIG. 1, at this time, the clock signal extracted by the clock signal regenerator (CDR) 58 is output to the display device 3. In this case, although video data are stopped, the display device 3 is not brought into the standby state. Therefore, the presence information about the clock signal of the video signal is multiplexed into the serial data through the transmitter 4 and the serial data are transmitted to the receiver 5. In the receiver 5, the presence information about the clock of the video signal is acquired. If the clock signal of the video signal is not present, the output of the clock to the display device 3 is stopped through the clock control circuit 75. If the clock signal of the video signal is present, the clock is output to the display device 3. Consequently, power saving of the display device can be achieved and data can be prevented from being displayed uselessly.

Figure 8:
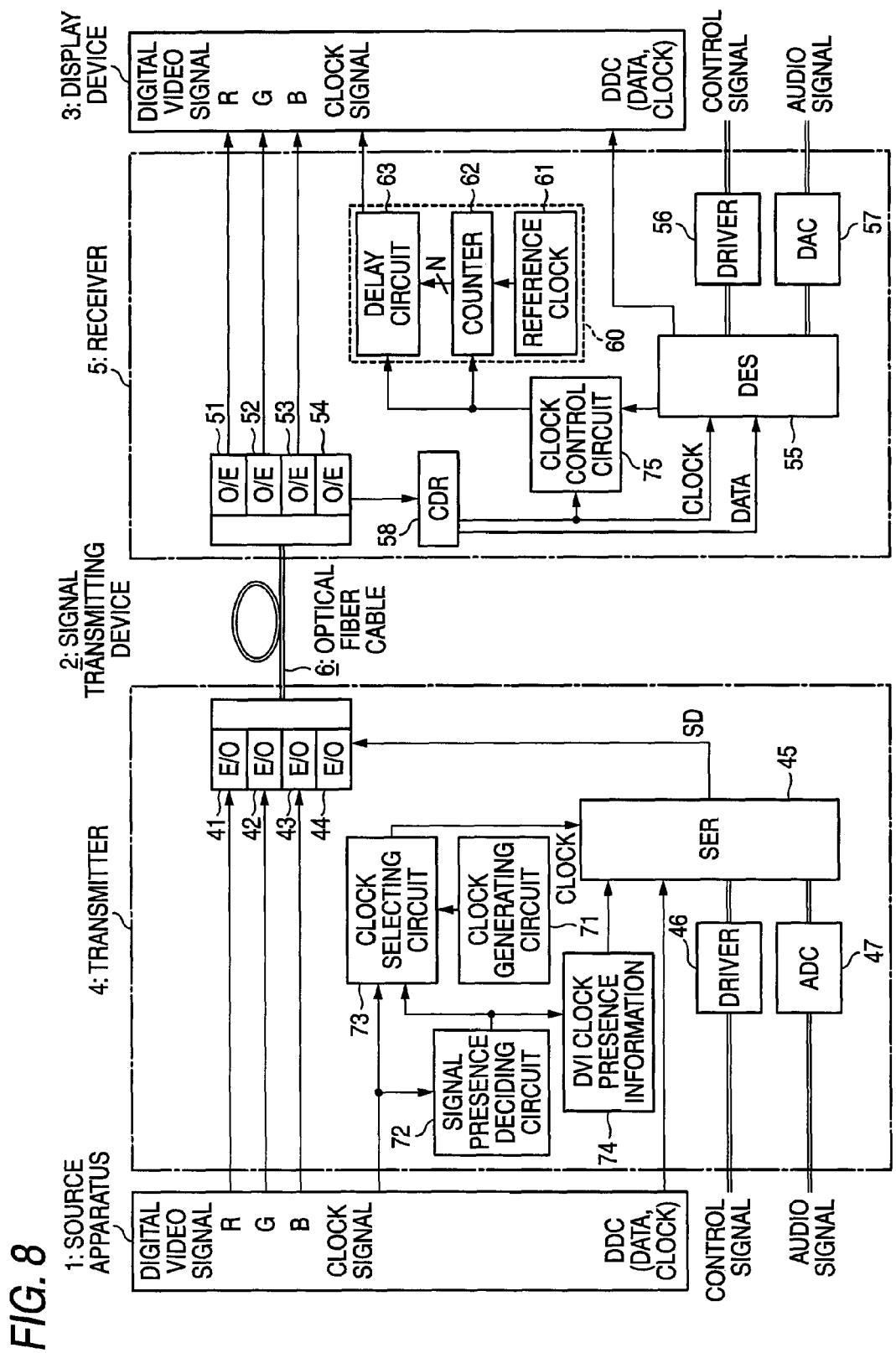
FIG. 8 is a diagram showing a further exemplary embodiment of the signal transmitting device.

FIG. 8 is a diagram showing a further exemplary embodiment of the signal transmitting device. Although the exemplary embodiment is different from the exemplary embodiment in FIG. 6 in that a timing shift (a skew) generated between R, G and B signals of a digital video signal and a clock signal is adjusted in a receiver 5, it is the same as the exemplary embodiment in FIG. 6 in the other respects. In other words, in the exemplary embodiment, the receiver 5 is provided with a timing adjuster 60 for adjusting a shift of a timing between a clock signal regenerated by a clock signal regenerator 58 and the video signal in the same manner as in the exemplary embodiment of FIG. 4. The timing adjuster 60 has a reference clock generator 61, a counter 62 and a delay circuit 63. Since the operation is the same as that in the exemplary embodiment of FIG. 4, description will be omitted.

Figure 9:
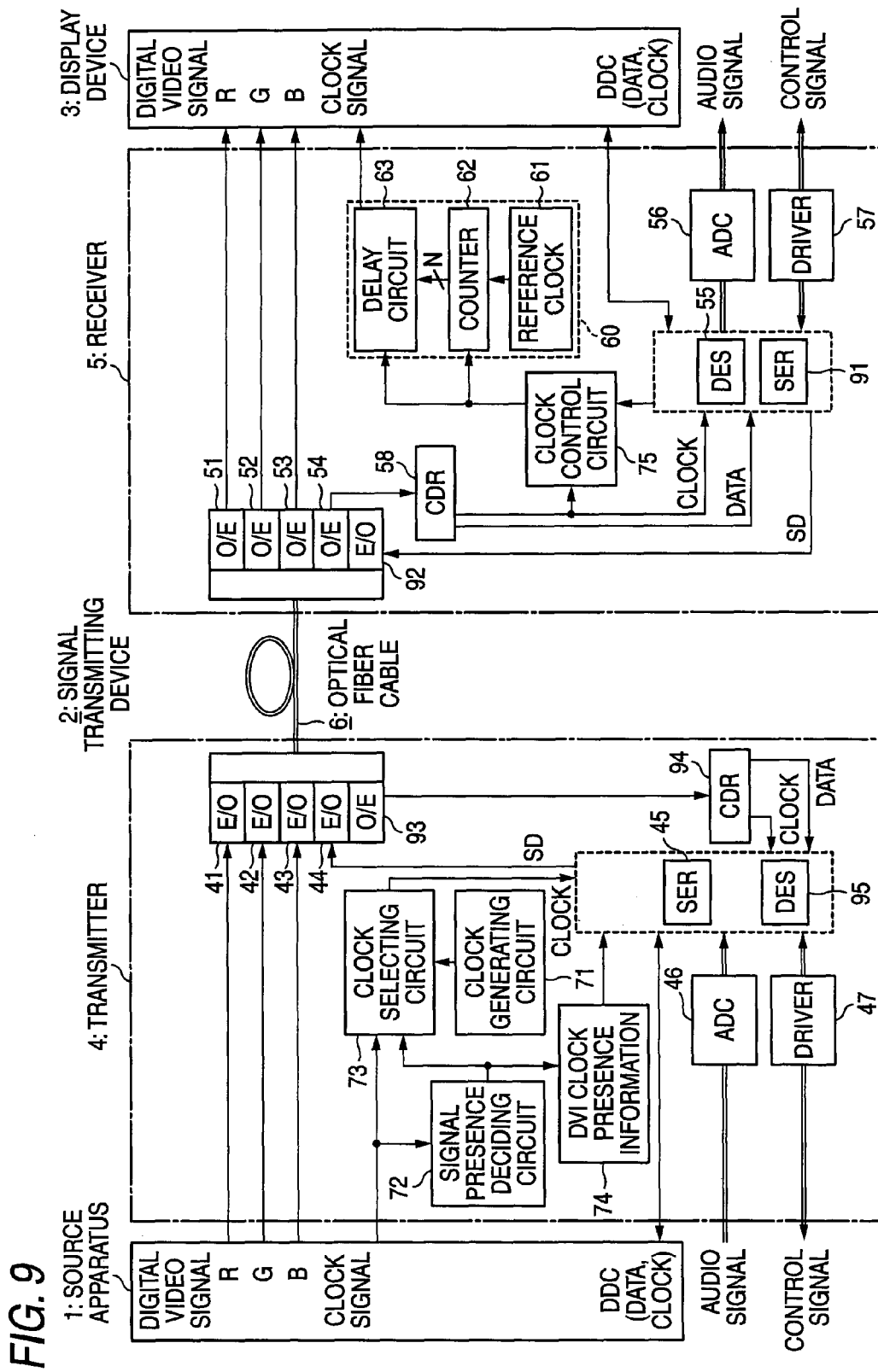
FIG. 9 is a diagram showing a further exemplary embodiment of the signal transmitting device.

FIG. 9 is a diagram showing a further exemplary embodiment of the signal transmitting device. Although the exemplary embodiment is different from the exemplary embodiment in FIG. 8 in that a signal is changed into a light and the light is transmitted from a receiver to a transmitter, it is the same as the exemplary embodiment of FIG. 8 in the other respects. In other words, in the exemplary embodiment, a receiver 5 has a parallel/serial converter 91 for converting a parallel signal having a lower speed than that of a video signal into a serial signal by using a clock signal regenerated by a clock signal regenerator 58, and a fifth electro-optical converter 92 for electro-optically converting the serial signal transmitted from the parallel/serial converter 91. Moreover, a transmitter 4 has a fifth optical-electro converter 93 for optical-electro converting the serial signal transmitted from an optical fiber connected to the fifth electro-optical converter 92, a clock signal regenerator 94 for regenerating a clock signal from the serial signal thus converted optical-electro, and a serial/parallel converter 95 for converting the optical-electro converted serial signal into a parallel signal by using the regenerated clock signal.

Although the exemplary embodiments shown in FIGS. 1 to 8 employ the structure in which the control signal is transmitted in a single direction from the transmitter side to the receiver side, the exemplary embodiment employs the structure considering the case in which a control signal such as RS232C is a two-way signal. In this case, a return signal from the receiver to the transmitter has a lower speed than that of a serial signal obtained by multiplexing audio, control and DDC signals. Therefore, the return signal can be transmitted sufficiently with a clock sent from the transmitter to the receiver. Serial data transferred from the receiver side use a clock extracted from a clock signal regenerator (CDR). Although an optical fiber cable 6 storing five optical fibers is utilized and one of them is used for changing the return signal of the control signal from the receiver to the transmitter into a light and transmitting the light as shown in FIG. 9 in the exemplary embodiment, the invention is not restricted thereto. For example, five optical fibers may be provided individually, and it is also possible to use five optical fibers in a single optical fiber cable which stores at least six optical fibers and has at least six cores. Moreover, it is also possible to carry out a transmission in a one-core two-way direction by using an optical fiber for serial data (SD) transferred from the transmitter to the receiver, for example. In this case, it is possible to execute the transmission by providing an optical multiplexer demultiplexer on each of transmitting and receiving sides and changing wavelengths of up and down signals of the optical fiber. Since this is a well-known technique, however, further description will be omitted.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

What is claimed is:

1. A signal transmitting device comprising:
   a transmitter that includes:
      a first electro-optical converter electro-optically converting original electrical red video signal in original video signal according to DVI standard into optical red video signal;
      a second electro-optical converter electro-optically converting original electrical green video signal in the original video signal into optical green video signal;
      a third electro-optical converter electro-optically converting original electrical blue video signal in the original video signal into optical blue video signal;
      a parallel/serial converter converting original electrical parallel signal having a lower transfer rate than a transfer rate of the original video signal into original electrical serial signal based on an original clock signal of the original video signal; and
      a fourth electro-optical converter electro-optically converting the original electrical serial signal transmitted from the parallel/serial converter into optical serial signal;
   a receiver that includes:
      a first optical-electro converter optical-electro converting the optical red video signal into electrical red video signal;
      a second optical-electro converter optical-electro converting the optical green video signal into electrical green video signal;
      a third optical-electro converter optical-electro converting the optical blue video signal into electrical blue video signal;
      a fourth optical-electro converter optical-electro converting the optical serial signal into electrical serial signal;
      a clock signal generator generating clock signal from the electrical serial signal; and
      a serial/parallel converter converting the electrical serial signal into electrical parallel signal based on the clock signal,
   four optical fibers that optically connect the first to fourth electro-optical converters to the first to fourth optical-electro converters respectively.

2. The signal transmitting device according to claim 1, wherein the transmitter further includes a frequency synthesizer multiplying the original clock signal, and
   the parallel/serial converter converts the original electrical parallel signal into the original electrical serial signal by using the multiplied original clock signal.

3. The signal transmitting device according to claim 1, wherein the receiver further includes a timing adjuster adjusting shift of timing between the clock signal and a video signal including the electrical red video signal, the electrical green video signal, and the electrical blue video signal.

4. The signal transmitting device according to claim 1, wherein the transmitter further includes:
   a clock signal generating circuit generating a substitute clock signal;
   a signal presence determination circuit determining a presence of the original clock signal and generating presence information indicating the presence; and
   a clock selecting circuit selecting the substitute clock signal as a clock signal to be used in the parallel/serial converter when the presence information indicates that the original clock signal is not present.

5. The signal transmitting device according to claim 4, wherein the parallel/serial converter multiplexes the determination information into the original electrical serial signal, and
   the receiver further includes a clock control circuit controlling the receiver to output the clock signal when the presence information indicates that the original clock signal is present and not to output the clock signal when the presence information indicates that the original clock signal is not present.

6. The signal transmitting device according to claim 1 further comprising a fifth optical fiber,
   wherein the receiver further includes:
      a second parallel/serial converter converting a second electrical parallel signal having a lower transfer rate than a transfer rate of the original video signal into second electrical serial signal based on the clock signal; and
      a fifth electro-optical converter electro-optically converting the second electrical serial signal into second optical serial signal, and the transmitter further includes:
      a fifth optical-electro converter optical-electro converting the second optical serial signal into third electrical serial signal,
      a second clock signal generator generating second clock signal from the third electrical serial signal, and
      a second serial/parallel converter converting the third electrical serial signal into third electrical parallel signal based on the second clock signal
   the fifth optical fiber optically connects the fifth electro-optical converter to the fifth optical-electro converter.

7. The signal transmitting device according to claim 1, wherein the four optical fibers are stored in a single optical fiber cable.

8. A transmitter comprising:
a first electro-optical converter that electro-optically converts original electrical red video signal in original video signal according to DVI standard into optical red video signal;
a second electro-optical converter that electro-optically converts original electrical green video signal in the original video signal into optical green video signal;
a third electro-optical converter that electro-optically converts original electrical blue video signal in the original video signal into optical blue video signal;
a parallel/serial converter that converts original electrical parallel signal having a lower transfer rate than a transfer rate of the original video signal into original electrical serial signal based on an original clock signal of the original video signal; and
a fourth electro-optical converter that electro-optically converts the original electrical serial signal transmitted from the parallel/serial converter into optical serial signal.

9. The transmitter according to claim 8 further comprising a frequency synthesizer multiplying the original clock signal, and
wherein the parallel/serial converter converts the original electrical parallel signal into the original electrical serial signal by using the multiplied original clock signal.

10. The transmitter according to claim 8 further comprising:
a clock signal generating circuit that generates a substitute clock signal;
a signal presence determination circuit that determines a presence of the original clock signal and generating presence information indicating the presence; and
a clock selecting circuit that selects the substitute clock signal as a clock signal to be used in the parallel/serial converter when the presence information indicates that the original clock signal is not present.

11. The transmitter according to claim 10, wherein the parallel/serial converter multiplexes the presence information into the original electrical serial signal.

12. A receiver comprising:
a first optical-electro converter that optical-electro converts optical red video signal into electrical red video signal;
a second optical-electro converter that optical-electro converts optical green video signal into electrical green video signal;
a third optical-electro converter that optical-electro converts optical blue video signal into electrical blue video signal;
a fourth optical-electro converter that optical-electro converts optical serial signal into electrical serial signal;
a clock signal generator that generates clock signal from the electrical serial signal; and
a serial/parallel converter that converts the electrical serial signal into electrical parallel signal based on the clock signal.

13. The receiver according to claim 12 further comprising a clock control circuit controlling the receiver to output the clock signal when determination information in the electrical parallel signal indicates a first state and not to output the clock signal when the determination information indicates a second state.

14. The receiver according to claim 12, wherein the receiver further includes a timing adjuster adjusting shift of timing between the clock signal and a video signal including the electrical red video signal, the electrical green video signal, and the electrical blue video signal.

* * * * *